United States Patent [19]
Wiggins

[11] Patent Number: 4,995,420
[45] Date of Patent: Feb. 26, 1991

[54] GLOVE BOX VALVE SYSTEM

[75] Inventor: Rodney K. Wiggins, Danville, Calif.

[73] Assignee: The United States of America as represented by the United States Department of Energy, Washington, D.C.

[21] Appl. No.: 565,526

[22] Filed: Aug. 10, 1990

[51] Int. Cl.5 ............................................. F16K 31/46
[52] U.S. Cl. ................................... 137/360; 251/214; 251/292; 251/293
[58] Field of Search ...................... 251/214, 292, 293; 137/360

[56] References Cited

U.S. PATENT DOCUMENTS

| | | | |
|---|---|---|---|
| 1,573,287 | 2/1926 | Williams, Jr. et al. | 251/293 |
| 1,637,230 | 7/1927 | Mueller | 137/360 |
| 2,198,455 | 4/1940 | Mueller et al. | 251/293 |
| 2,715,359 | 8/1955 | Mackintosh et al. | 98/115.3 |
| 2,786,740 | 3/1957 | Taylor et al. | 312/1 |
| 2,862,307 | 12/1958 | Bloomer et al. | 312/1 |
| 2,954,797 | 10/1960 | Dryer | 251/293 X |
| 3,719,202 | 3/1973 | Fitzpatrick | 137/360 |
| 3,907,389 | 9/1975 | Cox et al. | 312/1 |
| 3,957,077 | 5/1976 | Grandjean | 251/292 X |
| 4,686,328 | 8/1987 | Ui et al. | 174/153 R |

FOREIGN PATENT DOCUMENTS 616542 3/1961 Canada .............................. 137/360

Primary Examiner—John Rivell
Attorney, Agent, or Firm—L. E. Carnahan; Roger S. Gaither; William R. Moser

[57] ABSTRACT

A valve system is provided which enables the opening and closing of a valve to be controlled from outside a hermetically-sealed container such as a glove box. The system also is capable of adjusting the packing nut of the valve from outside the container.

7 Claims, 1 Drawing Sheet

GLOVE BOX VALVE SYSTEM

BACKGROUND OF THE INVENTION

The government has rights in this invention pursuant to Contract No. W-7405-ENG-48.

This invention is directed to a glove box valve system which allows for the control, tightening of packing, and adjustment of a valve within the glove box by a mechanism located outside the glove box.

Currently fluid conduits including valves for directing and controlling the flow of hazardous fluids are frequently contained within a hermetically sealed container such as a glove box which is sealed from the ambient surrounds. The glove box permits the valve to be adjusted through use of gloves sealingly contained in the glove box wall. In this manner any leakage of fluid from the valve or the conduit will be safely contained within the glove box. As the packing becomes loose, the fluid, which may be a gas, escapes from the valve to the valve exterior. In addition to controlling the valve, the valve packing may also be tightened by using the gloves to manipulate wrenches within the glove box. To tighten the packing, which must be done from time to time, one wrench grips a smaller hex nut head and another grips a larger hex nut head and the smaller hex nut is turned.

The tightening of the packing within the glove box is very difficult because of the cumbersome gloves which inhibit motion. A similar difficulty is experienced when the valve handle, which is located in the glove box, is picked up by means of the gloves and placed on and engaged on the valve stem to operate the valve. Viewing of the operation is also inhibited by the fact that the operator must view the turning of the valve stem or tightening of the valve packing nuts through a window or port in the glove box.

One attempted solution to the problem thus posed of containing leakage from a valve so that it does not contaminate the ambient environment is to pass a part communicating with a valve through the wall of the containing box. Such a system is shown and described in U.S. Pat. No. 2,715,359 to Mackintosh, et al. This does not provide the desired solution, however, because the fluid can leak around the part where it passes through the containing box wall.

SUMMARY OF THE INVENTION

It is the primary object of the invention to provide a mechanism for controlling and adjusting a valve located within a glove box or other hermetically sealed environment from the exterior so as to minimize the possibility of leakage.

The above object of the invention is solved herein as follows. The invention comprises a valve control assembly having a face plate unit of metal material which is mounted on the exterior surface of a glove box or the like. A portion of the valve control assembly extends through a hole in the wall and has a hex-shaped bore therein which accommodatingly fits over and restrains the large hex nut of a valve within the box. A packing tightener of metal material is rotatably mounted within a central bore in the face plate unit. The packing tightener also has a hex-shaped bore within its inner end which fits over and transmits motion to the small hex nut of the valve. Rotary motion is imparted to the small hex nut by using a wrench to turn a hex nut on the packing tightener which is exterior to the box. In this manner the valve packing may be tightened as needed.

The valve itself is controlled by means of a stem turner of metal which is rotatably mounted in a central through bore in the packing tightener. The stem turner has a stem on its outer end which is exterior to the box which may be manually turned by means of a removable valve handle. The stem turner has an inner bore which fits over the valve stem and is fixed thereto by means of a set screw.

Seals are provided with the valve control assembly to serve as barriers to the escape of possibly hazardous fluid from the glove box. Because the stem tightener and packing tightener are both manually manipulable from outside the box, the box does not have to be opened to tighten the valve packing or to control the valve.

Venting means are also provided for relieving fluid that may leak from the valve, so that it is directed back into the glove box rather than to the ambient surrounds outside the box.

DETAILED DESCRIPTION OF THE INVENTION

Figure 1:
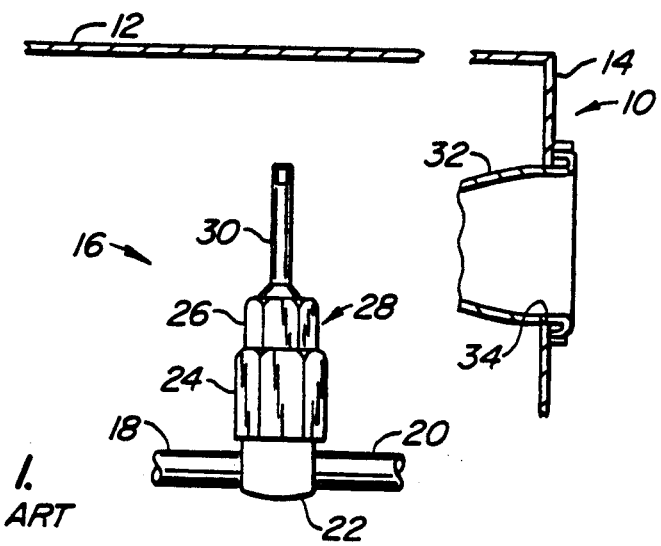
FIG. 1 is a partial schematic elevation view of a prior art glove box.

FIG. 1 is an illustration of the prior art. In FIG. 1, a glove box shown generally at 10 is made up of a plurality of interconnecting walls, two of which are shown at 12, 14. A standard valve 16 is located within the hermetically-sealed glove box 10. Such valve controls flow of a fluid such as a gas from an inlet conduit or line 18 to an outlet conduit or line 20. The valve itself comprises a valve body 22 of generally cylindrical configuration. The valve includes an upper body portion in the form of a large hexagonally-shaped head 24.

Also, as is conventional with these standard valves, a small hexagonally-shaped head 26 is formed on the upper portion of a packing tightener 28. Such small "hex" head is rotatable by means of a wrench engaging the hexagonal surfaces thereof to screw the packing tightener down into the valve and thereby tighten the valve packing (not shown) located within the valve body 22. A valve stem is rotatable by means of a removable valve handle (not shown) to open or close the valve in the conventional manner.

From time to time, the valve packing must be tightened. This is accomplished with this prior art device by placing the operator's hands within a pair of gloves, one of which is shown at 32, which are sealingly mounted in a circular port 34 in the wall 14. The port 34 is placed in close proximity to the valve to allow the operator to reach the valve. In order to tighten the valve packing, a pair of wrenches (not shown) are used. One wrench is manipulated by a glove to hold large hex head 24 while the other is used to grip and rotate small hex head 26. One glove is also used to turn the valve stem 30 by means of a handle (not shown) and thereby control the opening and closing of the valve.

Figure 2:
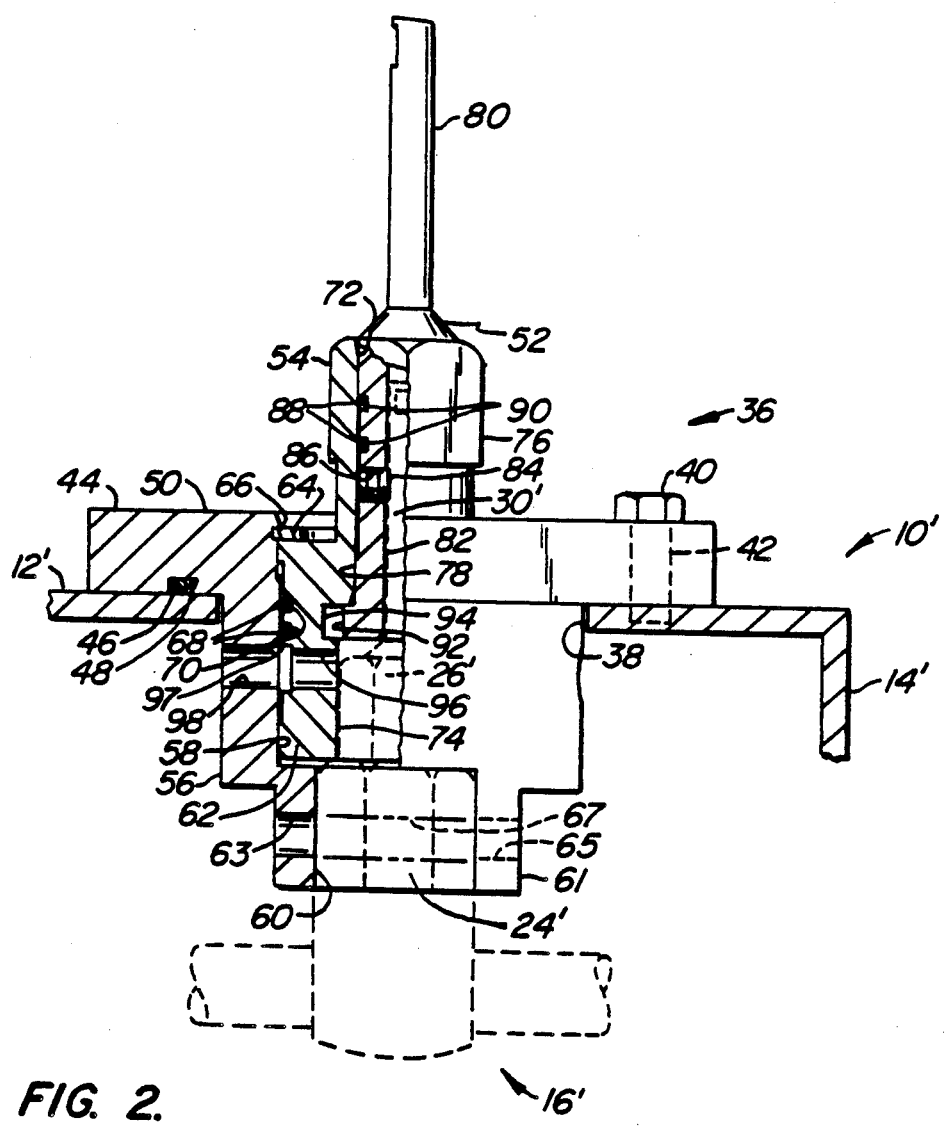
FIG. 2 is a partial cross-sectional elevational view of a preferred embodiment of the valve control assembly of the instant invention.

Turning to FIG. 2, there is shown a partial cross-sectional view of a valve control assembly shown generally at 36. The valve control assembly is shown mounted in a circular port 38 in the wall 12' of the glove box 10' which also includes wall 14'. The valve control assembly 36 may be mounted in the port 38 by any conventional mounting means such as bolts, one of which is shown at 40. Such bolts may be threadedly engaged in a bore (not shown) in wall 14 through bores (not shown) in a flat plate portion 44 of assembly 36. A rubber static "O" ring seal 46 within a groove 48 is used to maintain a seal between the control assembly and the glove box.

The control assembly comprises a face plate unit 50, a stem turner 52, and an intermediate packing tightener 54. The face plate unit has a generally cylindrical, stepped body portion 56 projecting through port 38 and having an inner bore 58. A pair of spaced flanges 60, 61 projecting inwardly from body portion 56. Aligned bolt holes 63, 65 in the flanges permit a bolt (not shown) to be passed therethrough and an aligned bore 67 in hex head 24' of valve 16'. A nut (not shown) is used to secure the bolt. In this manner, the valve 16' with hex head 24' are held in place.

The packing tightener 54 is of stepped outer and inner generally cylindrical configuration. Lower portion 62 has a cylindrical outer configuration dimensioned to be closely rotatable within bore 58 in face plate unit 50. It is held from axial displacement by means of a snap ring 64 in a cylindrical ring groove 66 within bore 58. A pair of dynamic rubber "O" ring seals 68 contained within grooves 70 circumferentially around lower portion 62 serve to prevent unwanted leakage of fluid from the glove box between these two relatively rotating parts.

Packing tightener 54 has stepped inner bores 72, 74 therein. Bore 74 is hexagonal in cross-section as to closely fit around small hex head 26'. When a wrench is used to turn hexagonally shaped head 76 of packing tightener 54, the rotary motion is transmitted to small hex head 26' and thereby tightens the packing (not shown).

The stem turner 52 has a cylindrical body portion 78 which is dimensioned to closely but freely rotate in bore 72 of packing tightener 54. The upper portion of stem turner 52 is a stepped-down stem 80 which may be turned by a removable handle (not shown). An inner, axial bore 82 within stem turner is fitted over valve stem 30' and is held thereto by means of a set screw 84 threadedly engaged in a bore 86 radially located in packing tightener 54. A pair of dynamic "O" ring seals 88 are located in grooves 90 in body portion 78. Finally, a flange 92 on the lower end of body 78 interacts with circumferential groove 94 on inner bore 74 to prevent axial displacement of the stem turner 52.

A radial bore 96 in packing tightener 54 communicates inner bore 74 with a circumferential groove 97 around the exterior of lower portion 62 of the packing tightener. Another radial bore 98 communicates inner bore 58 and thus axial groove 97 with the exterior of body portion 56. In this manner, any fluid that might leak out of valve 16' is relieved through bore 96, groove 97 and bore 98 to the interior of the glove box or container instead of around "O" rings 68 and snap ring 64 or "O" rings 88.

The above description of the invention is merely illustrative thereof and various changes in the materials and the details in the construction and method may be within the scope of the appended claims.

What is claimed is:

1. A valve system for a hermetically-sealed container having walls and a valve within said container comprising:

a face plate means mounted over an opening in one of said walls, said face plate means having a body portion thereof projecting through said opening and adapted to restrain rotation of a valve body of said valve in said container;

a packing tightener means sealingly rotatable within said face plate means and adapted to be manipulated outside said container to impart rotation to a packing nut rotatably mounted on said valve body to thereby tighten packing in said valve; and, a valve stem turner means sealingly rotatable within said packing tightener means and adapted to be manipulated outside said container to impart rotation to a valve stem rotatably mounted in said valve to thereby control the opening and closing of said valve.

2. The invention of claim 1 wherein said face plate means includes a plurality of surfaces formed on said portion adapted to mate with a plurality of surfaces on said valve body.

3. The invention of claim 1 wherein said packing tightener means comprises a generally elongated packing tightener having a plurality of surfaces formed in an end thereof adapted to mate with said packing nut.

4. The invention of claim 3 wherein said packing tightener means further includes means on the opposite end thereof for imparting rotational motion to said packing tightener.

5. The invention of claim 1 wherein said valve stem turner means comprises a generally elongated packing tightener having an axial bore in an end thereof adapted to fit over said valve stem, and means for attaching said valve stem tightener to said valve stem so that rotation of said valve stem tightener will cause corresponding rotation of said valve stem.

6. The invention of claim 5 wherein said valve stem tightener has means on an opposite end thereof adapted to engage a valve handle for rotation of said valve stem.

7. The invention of claim 4 further including vent means in said body portion of said face plate means and said packing tightener means for directing fluid that may leak from the valve back into the container.

* * * * *